United States Patent [19]

Lazarchuk

[11] 4,254,670

[45] Mar. 10, 1981

[54] WORK TABLE LOCATING DEVICE

[76] Inventor: Roman Lazarchuk, 6810 Rosemont, Detroit, Mich. 48228

[21] Appl. No.: 938,412

[22] Filed: Aug. 31, 1978

[51] Int. Cl.³ .............................................. B23Q 17/04
[52] U.S. Cl. ........................................ 74/815; 74/826; 269/69
[58] Field of Search ................. 74/813 R, 813 L, 815, 74/826; 269/69

[56] References Cited

U.S. PATENT DOCUMENTS

| 2,565,787 | 8/1951 | Tennant | 74/815 |
| 2,787,175 | 4/1957 | Schurger | 74/815 |
| 3,422,710 | 1/1969 | Kilmer | 74/815 |

FOREIGN PATENT DOCUMENTS 376347  3/1962  Switzerland ............................... 74/815

Primary Examiner—Kenneth Dorner
Attorney, Agent, or Firm—Whittemore, Hulbert & Belknap

[57] ABSTRACT

Apparatus for performing machining operations on a workpiece or detail at different angles, comprising a rotatable table having a plurality of locating holes preferably spaced at one degree intervals about its periphery, two indexing pins insertable in the holes, and two indexing blocks having prongs provided with abutment surfaces in positions to be contacted by the pins. The table normally rests upon pads during a machining operation. To rotate the table to a new position, the table is lifted from the pads by a manually operable lifting mechanism. Anti-friction rollers support the table when raised to facilitate rotation.

5 Claims, 13 Drawing Figures

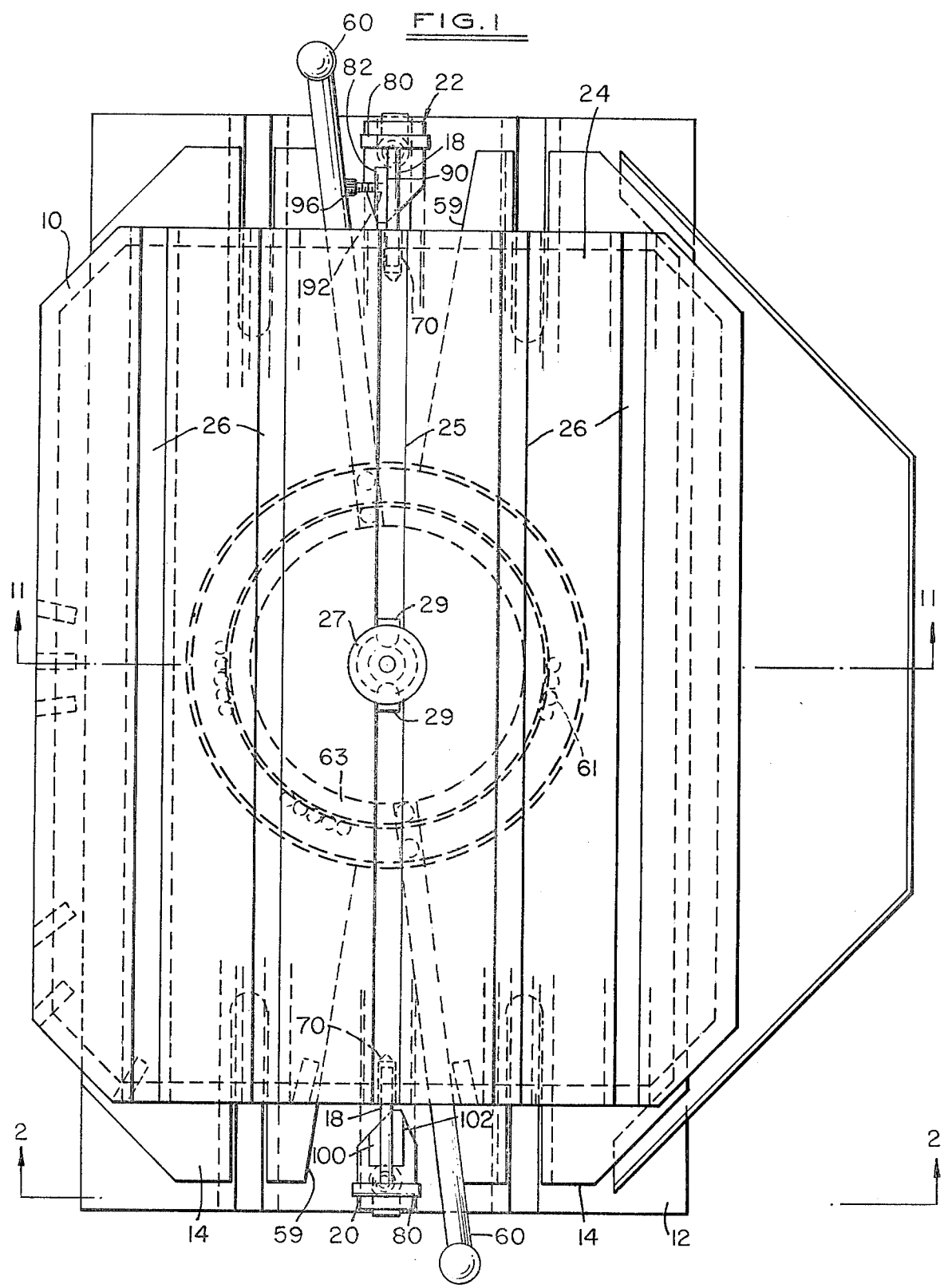

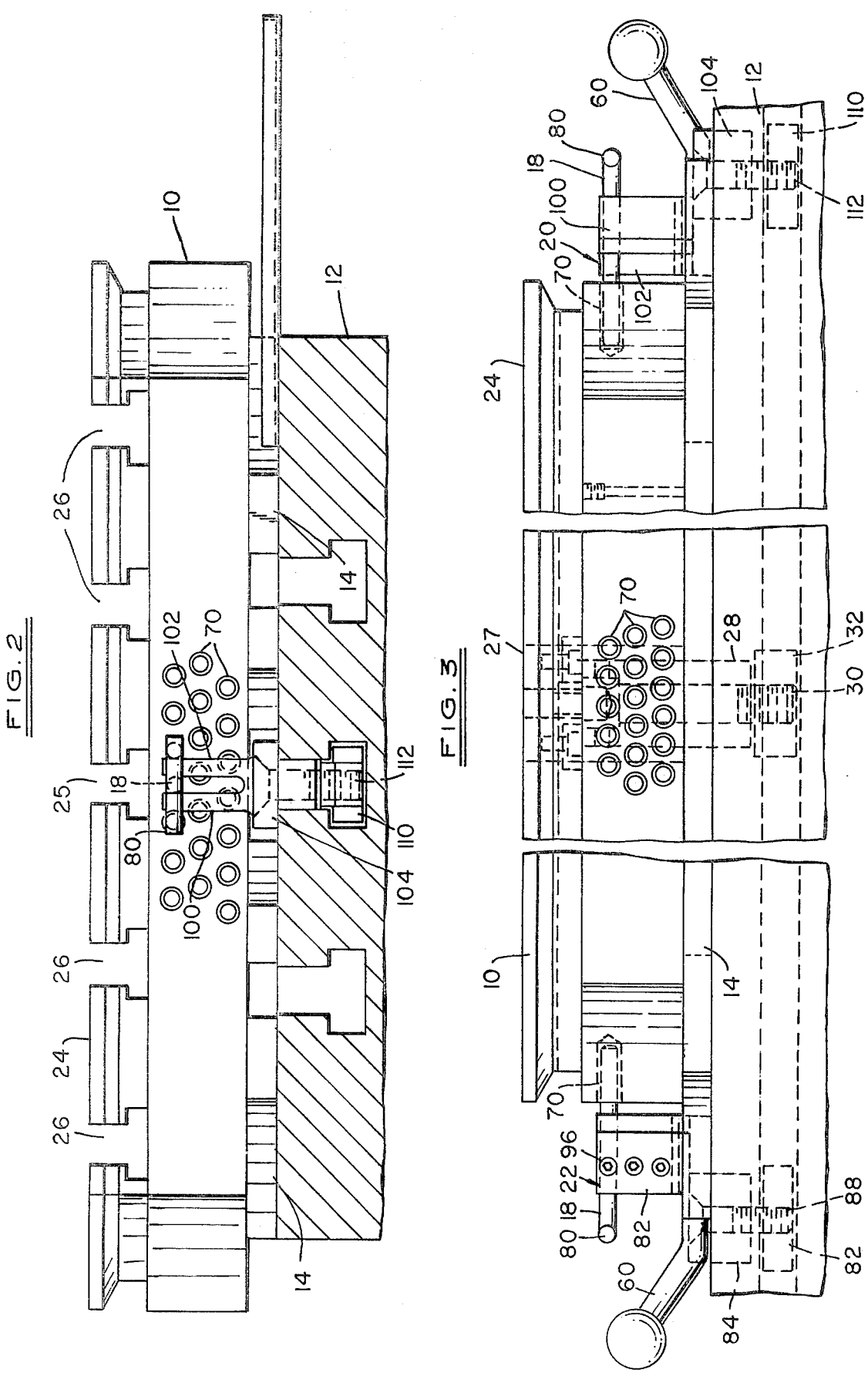

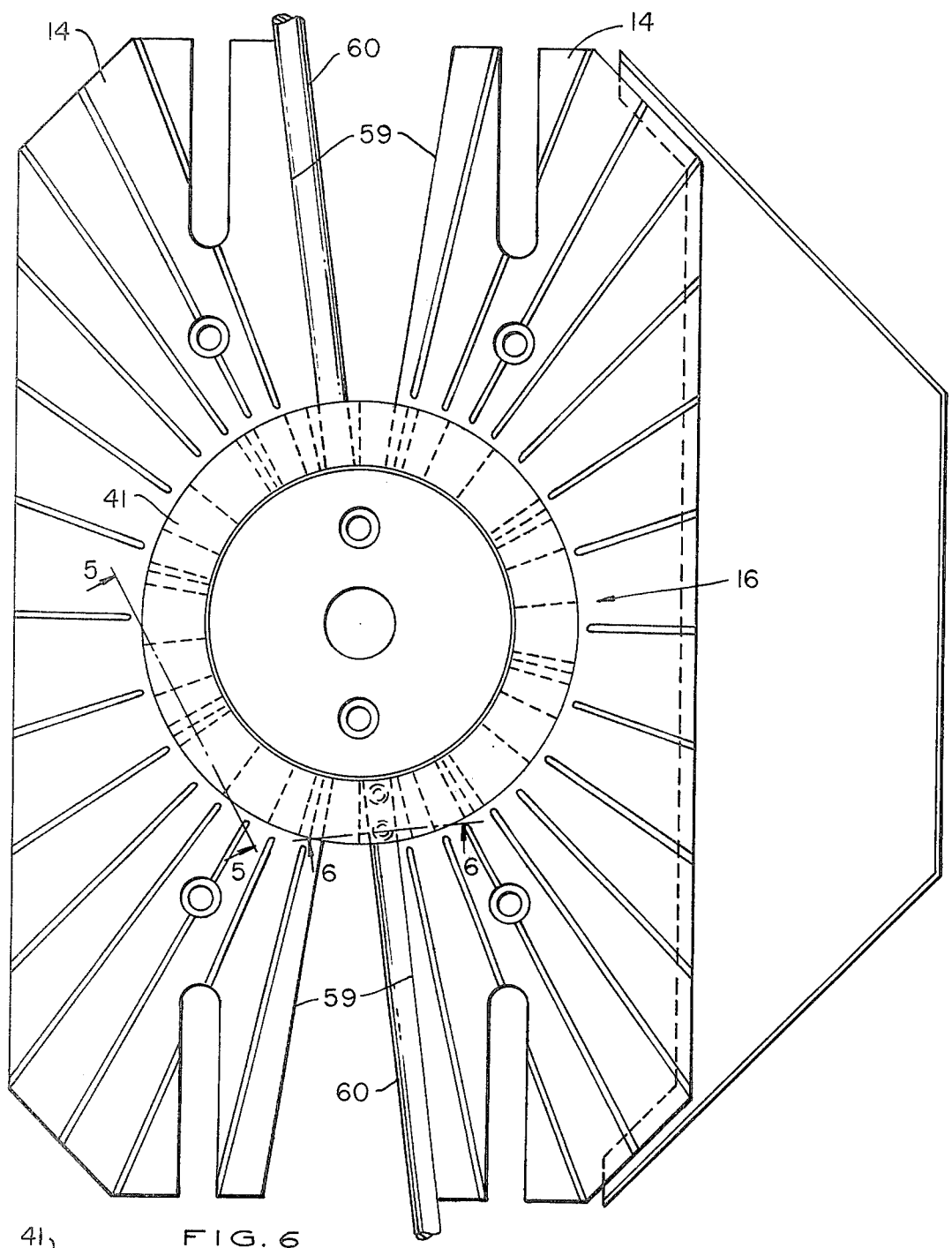

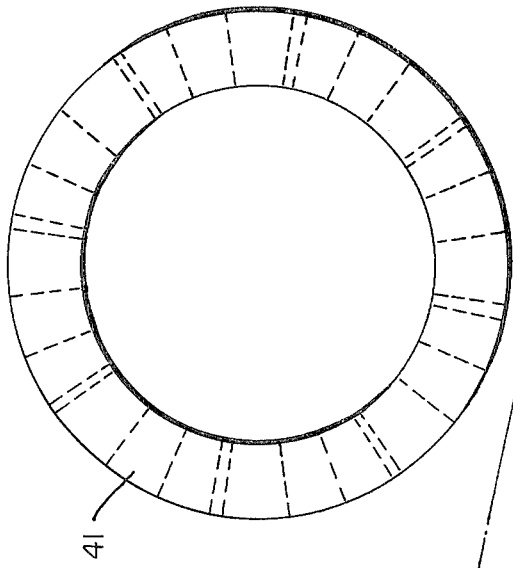
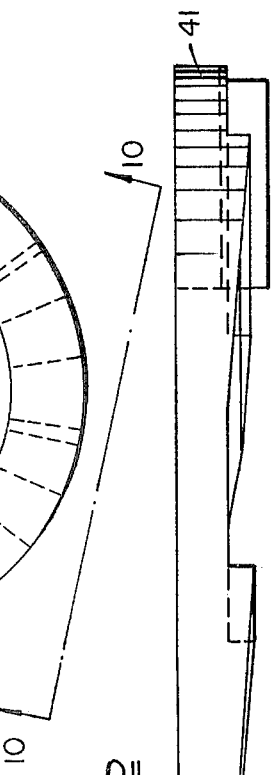
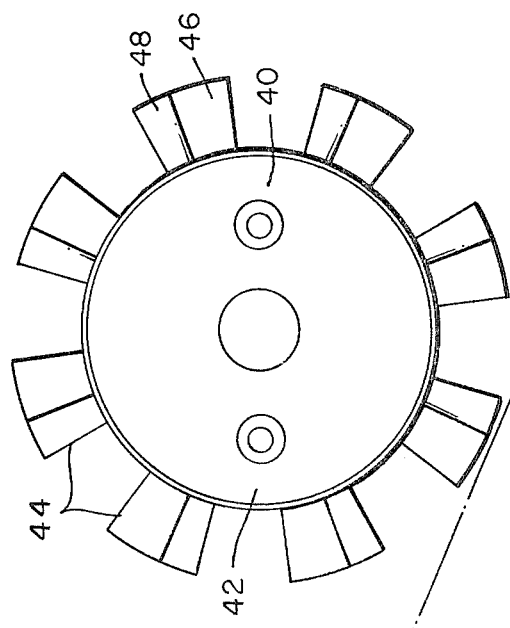
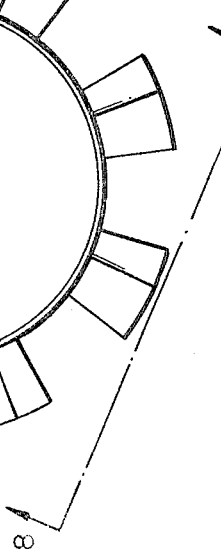
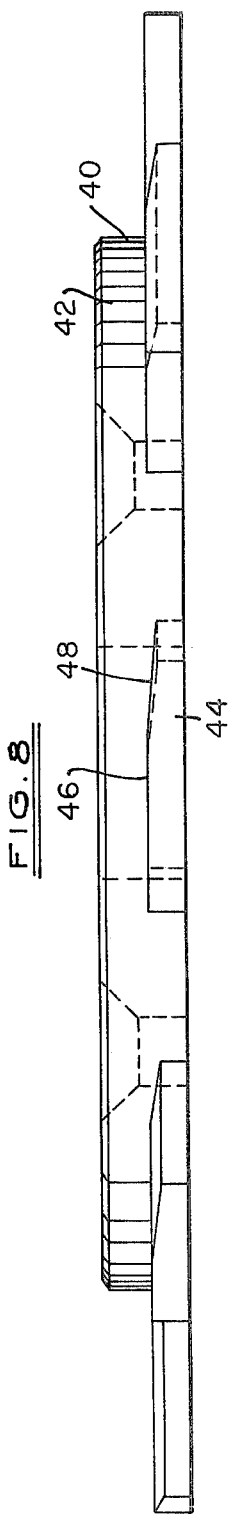

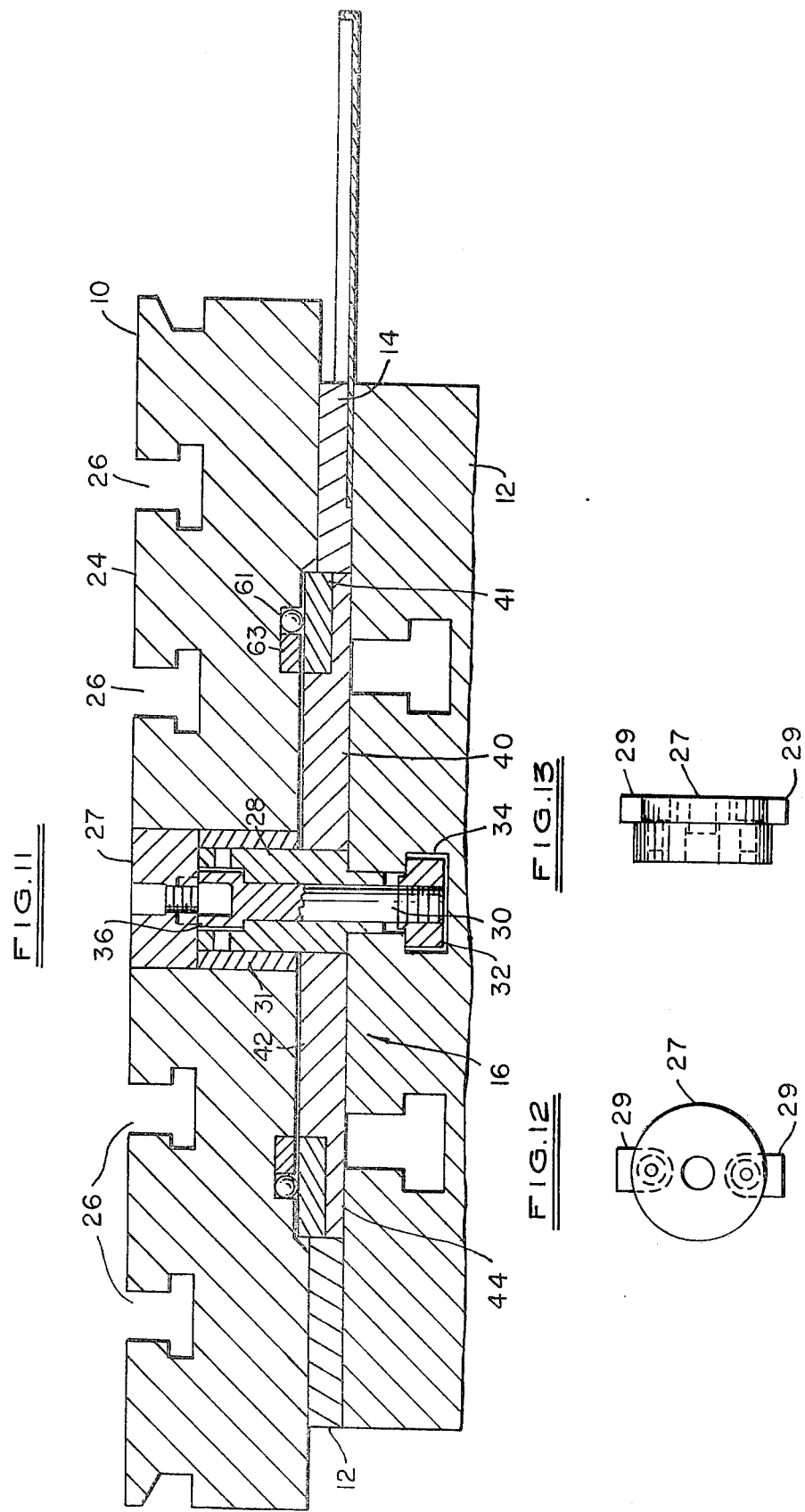

WORK TABLE LOCATING DEVICE

BACKGROUND AND SUMMARY OF THE INVENTION

Gearless turntables are available at the present time in which the angular position of the table is set by matching a line mark on the turntable with a line mark on a stationary base. The precision capable of being achieved depends on the eyesight of the individual and on the amount of illumination available. At best, it is difficult to adjust the position of the table to within ±0.004 inch of the desired precise angular setting.

Line marks may be used for rough machining, but are unsatisfactory where greater accuracy is needed. To achieve greater accuracy, as for example where the tolerance is ±0.004 inch, a sine bar and indicator have been used. However, the workpiece to be machined does not always have a convenient surface or points to attach the sine bar for indication. In that event, another parallel bar or angle plate has to be used in combination with the sine bar for indication purposes. Then, it is necessary to run the indicator back and forth until it shows a zero reading all along the indicated area.

There are also available at the present time geared rotary tables that provide sufficiently precise set-ups for all angular positions. However, it requires ninety turns of the crank to rotate them a full revolution. Some have a direct indexing arrangement for only every 10°. Ninety crank turns is too much cranking, and moreover the round tables provide space for only a limited range of rectangular details.

The apparatus of my invention eliminates the need for visual judgment to match up line marks, while at the same time providing a high degree of accuracy and repeatability. The total error is limited to ±0.001 of an inch. Considering that the same procedure is used for setting up all the desired angular positions, the error will be the same on all settings, thus minimizing itself, and accordingly the machined surfaces will be accurate in relation to each other.

In the apparatus about to be described, 360 locating holes are spaced at one degree intervals about the periphery of the turntable. Two indexing pins are provided which may be inserted in any of the holes. Indexing blocks are also provided having prongs provided with abutment surfaces for contact with the pins. One of the blocks employed has a single prong provided with a micrometer screw having the abutment surface thereon. Another of the blocks has two spaced prongs between which a pin is adapted to extend.

A turntable normally rests in friction contact on two pads during a machining operation. The table may be lifted from the pads by a manually operable lifting machanism in order to be rotated to another position. Anti-friction ball bearings support the table on the lifting mechanism when it is raised, to facilitate rotation.

Other objects and features of the invention will become apparent as the folowing description proceeds, especially when considered with the accompanying drawings, wherein:

FIG. 1 is top plan view of apparatus embodying my invention.

FIG. 2 is a view taken substantially on the line 2—2 in FIG. 1.

FIG. 3 is a side elevation of the apparatus as seen from the left in FIG. 1.

FIG. 4 is a top plan view of the support pads for the turntable, and also showing the lifting mechanism for raising the turntable, the turntable having been removed from this view for clarity.

FIG. 5 is a sectional view taken on the line 5—5 in FIG. 4.

FIG. 6 is a sectional view taken on the line 6—6 in FIG. 4.

FIG. 7 is a detail of the center disk, which forms one element of the lifting mechanism.

FIG. 8 is a view of the center disk as seen on the line 8—8 in FIG. 7.

FIG. 9 is a detail of the lifting ring, which forms another element of the lifting mechanism.

FIG. 10 is a view of the lifting ring as seen on the line 10—10 in FIG. 9.

FIG. 11 is a sectional view taken on the line 11—11 in FIG. 1.

FIG. 12 is a plan view of the spider which fits in the center of the table.

FIG. 13 is a side view of the spider.

Referring now more particularly to the drawings, the apparatus illustrated comprises a turntable 10 rotatably mounted on a stationary base 12, support pads 14 secured to the top of the base 12 and upon which the table 10 rests in friction contact during a machining operation, a lifting mechanism 16 for lifting the table out of contact with the pads so that the table may be indexed to different angular positions, indexing pins 18, and indexing blocks 20 and 22 for accurately and precisely locating the turntable 10 in the desired angular position. The lifting mechanism is necessary for relatively heavy tables, that is, tables weighing 150 to 200 pounds or more. Lighter tables may be indexed without a lifting mechanism by employing pads with oil grooves to facilitate rotation.

The table 10 has a horizontal top surface 24 to which a workpiece or detail, not shown, is secured for machining. A plurality of laterally spaced parallel T-slots are formed in the top surface of the table, the center one of which in designated 25 and the others 26. A spider 27 is secured in a central opening in the table. This spider 27 and the T-slots serve as the means by which a workpiece or detail may be centered and secured to the top surface of the table by suitable clamping devices, not shown. Spider 27 has dogs 29 adapted to extend across the T-slot 25 to prevent it from lifting out when in use.

The table 10 rotates on a tubular hub 28 secured to the base 12 by a bolt 30 and T-nut 32. The hub projects vertically upwardly from the base and has a bushing 31 around its upwardly projecting portion on which the table 10 is free to turn. The hub has a lower extension which extends into the base 12. The bolt 30 extends vertically through the hub and the T-nut 32 on the lower end secures the bolt 30 in the T-slot 34 in the base. The upper enlarged head 36 of the bolt 30 is disposed in the counterbored upper end portion of the hub to hold it down on the base.

The lifting mechanism 16 for lifting the table is a cam device and comprises a center disk 40 and a lifting ring 41. The center disk is bolted to the top surface of the base between the pads 14 in a concentric relation to the hub which extends through a hole in the center of the disk. The center disk has a central circular hub portion 42. A plurality of angularly spaced cam elements 44 project outwardly from the periphery of the hub portion each having an upper suface which includes a horizontal portion 46 and an inclined portion 48. The adjacent inner surfaces of the pads 14 are shaped to fit around the center disk as shown in FIG. 4.

The lifting ring 41 fits over the hub 42 of the center disk 40 and rests upon the cam elements 44. The contour of the undersurface of the ring is as shown in FIG. 5, having angularly spaced cam sections 47 each consisting of inclined portions 49 and 50 and horizontal portions 51 and 52, adjacent cam sections being connected by the vertical shoulders 54. When this cam ring 41 is in the position shown in FIG. 5, it is in the down position out of contact with the table, and permits the table to rest upon the pads 14 in friction contact therewith in the normal position for machining. Clamps, not shown, are preferably employed to positively secure the table against rotation with respect to the base during machining. The friction contact of the table with the pads alone may be sufficient to hold the table against rotation for scribing the layout lines. As seen in FIG. 4, the top surface of the pads 14 on which the table rests is serrated or ribbed to minimize surface-to-surface sticking when the table 10 is lifted for rotation.

A pair of handles 60 project radially outwardly between the edges 59 of pads 16 from diametrically opposite sides of the ring 41, being rigidly secured to the ring as indicated at 62 and provided for the purpose of rotating the ring to a position such that the surfaces 50 thereof ride up the cam surfaces 48 of the camming elements 44 of the cener disk, whereby to lift the table 10 out of the contact with the pads so that it is free to rotate. The edges 59 of the pads are spaced apart sufficiently to permit the required movement of the handles. In the raised position of the table, it is supported upon the top surface of the lifting ring 41 for rotation. The undersurface of the table has a ring of ball bearings 61 which engage the top surface of the lifting ring to facilitate the free rotation of the table thereon. Ball bearings 61 are held in a circular groove in the undersurface of the table by a retaining ring 63.

A plurality of horizontal, cylindrical locating holes 70 are formed around the outer periphery of the table 10. In the present instance, 360 such holes are provided, spaced apart at 1° intervals. These holes are arranged in three levels for convenience, although it will be understood that these holes may be distributed over fewer or more than three levels, as desired. At each level, there are 120 holes spaced 3° apart. Thus the upper level of holes may consist of holes placed at 0°, 3°, 6°, ... 357°, the middle level of holes may be placed at 1°, 4°, 7°, ... 358°, and the lower level of holes may be placed at 2°, 5°, 8°, ... 359°.

To index the table to a precise angular position, the cylindrical indexing pins 18 and indexing blocks 20 and 22 are employed in conjunction with the holes 70. The pins 18 are the same diameter as the holes 70 so that they may be inserted into any one of the holes. For convenience, the outer ends of the pins have T-shaped handles 80. The indexing blocks are of two different constructions. The indexing block 22 has a single vertical prong 82 projecting upwards from the base 84, the base being secured in radially adjusted position to the same T-slot as the hub, by a T-nut and bolt 86, 88. The prong 82 is a flat plate having a vertical surface 90 which provides an abutment surface adapted to be contacted by a pin 18 in a hole 70 of the table. The abutment surface extends from a point above the upper level of holes down a point beneath the lower level of holes so as to contact a pin 18 in a hole at any of the three levels. The prong 82 has a threaded transverse hole 92 at each level of holes to receive a micrometer screw 96, the inner end of which is adapted to project beyond surface 90 of the prong to provide an alternate abutment surface for contact with a pin 18. The screw is capable of fine adjustment in or out.

The other indexing block 22 comprises a pair of laterally spaced vertical flat, plate-like prongs 100 and 102, the inner surfaces of which are parallel and vertical. These prongs are connected to a base 104 secured to the same T-slot as the hub by a T-nut 110 and bolt 112. The spacing between the inner surfaces of the prongs 100 and 102 is the same as the diameter of the pin 18 so that the pin may extend between the prongs and be held without lateral movement. The height of the prongs is sufficient to receive a pin extending from a hole at any of the three levels.

In order to turn the table 10 from one angular position to another, the table must first be lifted off the pads 14. All hold-down clamps used to secure the table against rotation are released. The indexing blocks are unbolted and moved out of the T-slot 34. Handles 60 of the lifting ring 41 are moved horizontally to rotate the ring and lift the table to the up position in which it is free to rotate on the balls 61. The table will remain in the lifted position because the horizontal sections 51 of the lifting ring 41 rest upon the horizontal sections 46 of the cam elements 44 of the center disk 40. An indexing pin 18 is inserted into the indexing hole at the selected angle and the table then is turned to approximately desired position. At this point, the table is lowered partially by a partial turn of the handles 60 sufficiently to clear the area of the base where the indexing blocks are installed in the T-slot 34 in the base. The single pronged indexing block 22 is then bolted in the T-slot 34 as shown in FIG. 1 and the table is turned further until the indexing pin comes up against the vertical surface 90 of the prong 82. At this point, the other indexing block 20 is bolted in the T-slot 34 diametrically indexing block 22, as shown in FIG. 1, and a second pin 18 is inserted between the prongs 100 and 102 of the indexing block 22 into the aligned hole which is diametrically opposite the hole in which the first pin was inserted. The table is now properly located angularly and may be completely lowered into contact with the pads 14 and clamped down to the base for further machining of the detail on the table.

The foregoing procedure is followed for setting the table at whole degree positions. When setting the table to positions of fractional degrees of minutes and seconds, the two pronged indexing block 20 is not used. One and preferably two indexing blocks 22 in diametrically opposed positions are employed for this purpose. As stated previously, the single prong of each indexing block 22 may have a micrometer screw 96 threaded into any one of the transverse holes 92. The metering screw may have 100 graduations and Vernier lines for measuring tenths of a thousandth of an inch. The micrometer screw provides a precise sub-division of the space between two angles into minutes and seconds. When the table is lifted and rotated to its approximate position and then partially lowered to clear the space for the indexing blocks as described previously, one of the blocks 22 is installed in the position where it appears in FIG. 1 and a pin 18 is inserted into the degree hole nearest the precise table setting desired and the table rotated to bring the pin into contact with the surface 90 of the prong. Then the micrometer screw is rotated to extend its nose beyond the surface 90 to the extent necessary to set the table at the precise number of minutes and seconds desired. A second indexing block 22 may also be installed on the base at the diametrically opposite side of the table and have the nose of its micrometer screw likewise extended by threading the precise amount for contact by a second indexing pin 18 in a diametrically opposite hole. This second indexing block 22 will be secured in the position occupied by the indexing block 20 in FIG. 1.

The linear adjustment of the micrometer screw to turn the table the correct number of minutes and seconds will depend upon the distance of the indexing block from the center of the table. This distance will vary when the table is other than circular. For a rectangular table, there will be 91 such distances all of which may be different from one another, one such distance being for the position at 0°–180°, another for 90°–270°, and one for each of the 89 other degree distance combinations. A chart may be made for all 91 positions so that the distance that the indexing pin will have to be moved from the side of the prong by the micrometer screw for each minute and second may be readily determined.

What I claim as my invention is:

1. Apparatus for performing machining operations comprising a table for supporting a workpiece, means mounting said table for rotation, means for indexing said table to selected rotative positions, said indexing means comprising a plurality of holes in said table in spaced relation about the periphery thereof, an indexing pin engageable in any one of said holes, an indexing block having a prong provided with an abutment surface in the path of said pin when said pin is engaged in any one of said holes and said table is rotated, whereby said pin when engaged in a particular hole will contact said abutment surface and locate said table in a selected rotative position, a screw threadedly mounted on said prong, the tip of said screw projecting from said prong to provide a variable abutment surface, and means for releasably retaining said table against rotation from a selected rotative position.

2. Apparatus as defined in claim 1, wherein said means for indexing said table also includes a second indexing pin engageable in any one of said holes, and a second indexing block having spaced prongs which are spaced apart a distance approximating the width of said second pin and are disposed in the path of said second pin when said second pin is engaged in any one of said holes and said table is rotated so that said second pin may extend between the prongs of said second indexing block.

3. Apparatus as defined in claim 1, wherein said means for indexing said table also includes a second indexing pin engageable in any one of said holes, and a second indexing block having a prong with an abutment surface in the path of said second pin when said second pin is engaged in any one of said holes and said table is rotated, a second screw is threadedly mounted on the prong of said second indexing block, the tip of said second screw projecting from the prong of said second indexing block to provide a variable abutment surface.

4. Apparatus for performing machining operations comprising a table for supporting a workpiece, means mounting said table for rotation, means for indexing said table to selected rotative positions, said indexing means comprising a plurality of holes in said table in spaced relation about the periphery thereof, an indexing pin engageable in any one of said holes, an indexing block having a prong provided with an abutment surface in the path of said pin when said pin is engaged in any one of said holes and said table is rotated, whereby said pin when engaged in a particular hole will contact said abutment surface and locate said table in a selected rotative position, said means for indexing said table also including a second indexing pin engageable in any one of said holes, and a second indexing block having spaced prongs which are spaced apart a distance approximating the width of said second pin and disposed in the path of said second pin when said second pin is engaged in any one of said holes and said table is rotated so that said second pin may extend between the prongs of said second indexing block, and means for releasably retaining said table against rotation from a selected rotative position.

5. Apparatus for performing machining operations comprising a table for supporting a workpiece, means mounting said table for rotation, means for indexing said table to selected rotative positions, said indexing means comprising a plurality of holes in said table in spaced relation about the periphery thereof, said holes being arranged in at least two annular series one of which is disposed at a different level from the other, the holes in each series being spaced from one another and staggered with respect to the holes in the other series, an indexing pin engageable in any one of said holes, locating means in the path of said pin when said pin is engaged in any one of said holes and said table is rotated, whereby said pin when engaged in a particular hole will contact said locating means and locate said table in a selected rotative position, and means for releasably retaining said table against rotation from a selected rotative position.

* * * * *

UNITED STATES PATENT OFFICE
CERTIFICATE OF CORRECTION

Patent No. 4,254,670   Dated March 10, 1981

Inventor(s) Roman Lazarchuk

It is certified that error appears in the above-identified patent and that said Letters Patent are hereby corrected as shown below:

Col. 1, line 4 of paragraph 2, change "± 0.004 inch" to --± 0.001 inch--.

Signed and Sealed this

Twenty-sixth Day of May 1981

[SEAL]

Attest:

RENE D. TEGTMEYER

Attesting Officer   Acting Commissioner of Patents and Trademarks